UNITED STATES PATENT OFFICE.

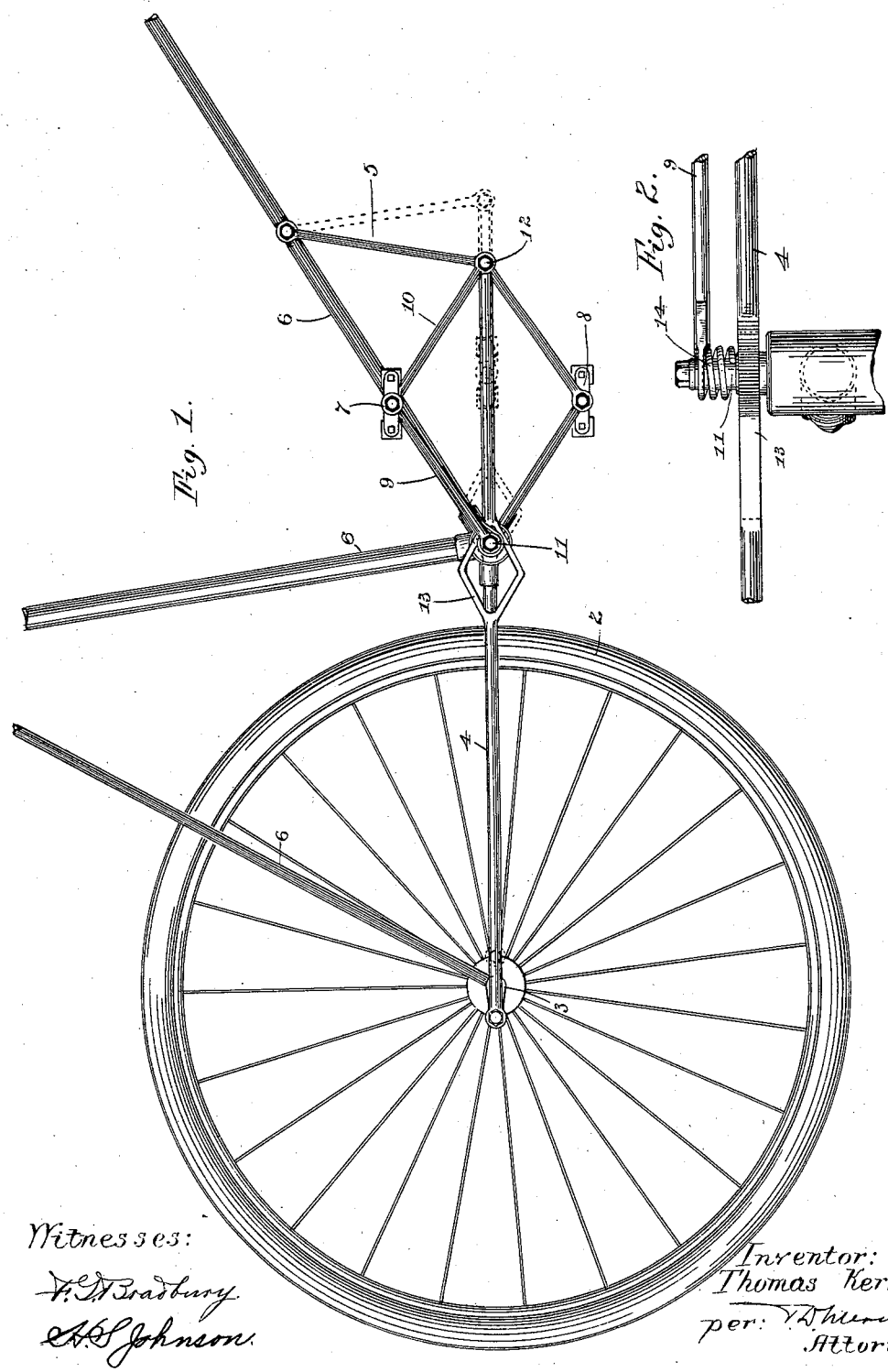

THOMAS KERKER, OF ST. PAUL, MINNESOTA, ASSIGNOR OF ONE-THIRD TO RUDOLPH F. BERREAU, OF SAME PLACE.

PROPELLING MECHANISM FOR BICYCLES OR SIMILAR MACHINERY.

SPECIFICATION forming part of Letters Patent No. 565,904, dated August 18, 1896.

Application filed September 21, 1895. Serial No. 563,172. (No model.)

*To all whom it may concern:*

Be it known that I, THOMAS KERKER, of St. Paul, Ramsey county, Minnesota, have invented certain Improvements in Propelling Mechanism for Bicycles or Similar Machinery, of which the following is a specification.

My invention relates to improvements in propelling mechanisms for bicycles and similar machinery, its object being to provide a gear which will dispense with sprocket-wheels and chain and will carry the treadles in their operation approximately in a vertical line and give a complete revolution of the wheel with each stroke of each treadle.

To this end my invention consists in providing one of the wheels of the bicycle with a crank to which is connected a horizontally-arranged pitman, the end of the pitman being supported by a link to the frame of the machine. The pitman is reciprocated by means of treadles, each carried by a pair of rods or links serving as a toggle-joint, one of them being pivoted to the frame and the other to the pitman, preferably at the point of its pivotal connection with its supporting-link. The treadles are so arranged as to rock in their movement as the ordinary arrangement of similar treadles.

My invention further consists in the construction and combination hereinafter particularly described and claimed.

In the accompanying drawings, forming part of this specification, Figure 1 shows a side elevation of a portion of a bicycle-frame equipped with my improved attachment, and Fig. 2 is a detail of the spring attachment for the treadles which tends to throw them out of dead-center position.

In the drawings the wheel 2 is provided with a crank 3, to which is connected the pitman 4. The outer end of the pitman is supported by means of the link 5, to which it is pivoted, upon the frame 6.

7 and 8 are treadles, each of which is pivotally supported upon the arms 9 and 10, which constitute a toggle-joint, the arm 9 being connected to the frame of the machine by means of the stud-pivot 11, and the arm 10 to the pivot 12, which connects the pitman with its supporting-link. In order that the pitman may work in line with the pivots of the toggle-joint instead of being offset from them, I form it with an oval or diamond-shaped opening 13, the two members forming the opening standing on opposite sides of the stud 11, so that they will not be brought into contact with the stud in the swaying motion of the pitman. In order to prevent the treadles standing at mid-stroke and so as to lift the crank out of dead-center, I prefer to provide a torsion-spring 14 around the stud 11, one end being connected to the stud and the other bearing upon the under side of the arm 9 so as to tend to lift the same and thereby carry it past dead-center position.

In operation with the working of the treadles the pitman is reciprocated, swinging freely upon its link 5, so as to drive the wheel 2 by means of the crank 3.

It will be evident that the pitman and connected cranks may be duplicated, if desired, so as to provide one for each treadle, without departing from the idea of the invention.

I claim—

1. In a combination toggle-joint and pitman movement for the purpose described, the combination with the fixed frame, the driving-wheel, and the crank upon said wheel of the reciprocating pitman connected to said crank, the swing-link for supporting the end of the pitman upon said frame, the toggle-joint having one arm connected to said pitman at or near its point of connection with said link and having its other arm pivotally connected to said frame.

2. In a combination toggle-joint and pitman movement for the purpose described, the combination with the fixed frame and driving-wheel, of the crank upon said wheel, the relatively horizontal pitman connected at one end with said crank, the swing-link connecting the other end of said pitman with said frame, the treadle and the pair of toggle-arms supporting said treadle, one of said arms being pivotally connected with said pitman, and the other arm being similarly connected with the frame intermediate of the treadle and wheel.

3. The combination with the driving-wheel and frame, of the crank upon said wheel, the relatively horizontal pitman connected with said crank, the swing-link for supporting the end of the pitman upon said frame, the treadle and the toggle-arms supporting said treadle, one of said arms being pivotally connected with the end of the pitman, the pivot-stud connecting the other arm with the frame, the pitman being provided with an opening in which said pivot-stud stands, so as to allow the pitman to reciprocate substantially in line with the pivots of the toggle-arms, without contact with said stud.

4. The combination with the driving-wheel and frame, and the crank upon said wheel, of the relatively horizontal pitman connected with said crank, the swing-link connecting the other end of said pitman with said frame, the treadle, the pair of toggle-arms supporting said treadle, the pivotal connection between one of said arms and the end of the pitman adjacent the swing-link, the pivot-stud connecting the other arm with the frame, and the torsion-spring upon said pivot-stud engaging its connected toggle-arm so as to carry the same out of mid-position.

In testimony whereof I affix my signature in presence of two witnesses.

THOMAS KERKER.

Witnesses:
H. S. JOHNSON,
MINNIE L. THAUWALD.